United States Patent
Rabin (10) Patent No.: US 8,100,769 B2
(45) Date of Patent: Jan. 24, 2012

(54) SYSTEM AND METHOD FOR USING ACCELEROMETER OUTPUTS TO CONTROL AN OBJECT ROTATING ON A DISPLAY

(75) Inventor: Steven Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 677 days.

(21) Appl. No.: 12/149,921

(22) Filed: May 9, 2008

(65) Prior Publication Data

US 2008/0287189 A1    Nov. 20, 2008

Related U.S. Application Data

(60) Provisional application No. 60/924,317, filed on May 9, 2007.

(51) Int. Cl.
*A63F 9/24* (2006.01)
(52) U.S. Cl. .................. 463/37; 463/30; 463/31; 463/32
(58) Field of Classification Search .................. 463/37, 463/38, 30–32
See application file for complete search history.

(56) References Cited

U.S. PATENT DOCUMENTS

| | | | |
|---|---|---|---|
| 5,440,326 A | | 8/1995 | Quinn |
| 5,525,901 A | * | 6/1996 | Clymer et al. ........... 324/207.21 |
| 5,574,479 A | | 11/1996 | Odell |
| 5,598,187 A | | 1/1997 | Ide |
| 5,615,132 A | * | 3/1997 | Horton et al. ..................... 703/7 |
| 5,627,565 A | | 5/1997 | Morishita et al. |
| 5,645,077 A | | 7/1997 | Foxlin |
| 5,757,360 A | | 5/1998 | Nitta et al. |
| 5,875,257 A | * | 2/1999 | Marrin et al. .................. 382/107 |
| 6,545,661 B1 | * | 4/2003 | Goschy et al. ................ 345/158 |
| 6,853,947 B1 | | 2/2005 | Horton |
| 6,982,697 B2 | | 1/2006 | Wilson et al. |
| 7,139,983 B2 | | 11/2006 | Kelts |
| 7,158,118 B2 | | 1/2007 | Liberty |
| 7,262,760 B2 | | 8/2007 | Liberty |
| 7,292,151 B2 | | 11/2007 | Ferguson et al. |
| 7,414,611 B2 | | 8/2008 | Liberty |
| 7,492,268 B2 | | 2/2009 | Ferguson et al. |
| 2004/0222969 A1 | | 11/2004 | Buchenrieder |
| 2007/0049374 A1 | | 3/2007 | Ikeda et al. |
| 2007/0050597 A1 | | 3/2007 | Ikeda |
| 2007/0052177 A1 | | 3/2007 | Ikeda et al. |
| 2007/0060391 A1 | | 3/2007 | Ikeda et al. |
| 2007/0066394 A1 | | 3/2007 | Ikeda et al. |
| 2007/0072580 A1 | | 3/2007 | Thomas et al. |

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.

(Continued)

*Primary Examiner* — Omkar Deodhar
(74) *Attorney, Agent, or Firm* — Nixon & Vanderhye P.C.

(57) ABSTRACT

An example system and method controls a rotatable object on a display using a handheld control device comprising an accelerometer. The example system and method involve determining an orientation of the handheld control device using an interpolation of an output for a first axis of the accelerometer and an output for a second axis of the accelerometer. The rotation of the rotatable object is controlled based on the determined orientation.

5 Claims, 11 Drawing Sheets

NON-LIMITING EXAMPLE GAME SYSTEM

OTHER PUBLICATIONS

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dII?ViewItem&item=350096666675&indexURL.

Web pages from Wikipedia of "Kirby Tilt 'n' Tumble" retrieved on Nov. 9, 2009 from http://en.wikipedia.org/wiki/Kirby_Tilt_'n'_Tumble, 2 pages.

Web pages from Wikipedia of "WarioWare: Twisted!" retrieved on Nov. 9, 2009 from http://en.wikipedia.org/wiki/Wario_Ware_Twisted, 3 pages.

Marrin, Teresa: "Possibilities for the Digital Baton as a General-Purpose Gestural Interface," Late-Breaking/Short Talks, Hyperinstruments Research Group, MIT Media Laboratory, CHI 97, Mar. 1997, pp. 311-312.

* cited by examiner

Fig. 1
NON-LIMITING
EXAMPLE GAME SYSTEM

Fig. 2

Fig. 3A
NON-LIMITING
EXAMPLE CONTROLLER

Fig. 3B
NON-LIMITING
EXAMPLE CONTROLLER

When controller 107 is pointed upward, the coordinates of the markers move down.

*Fig. 5B-1*

When controller 107 is pointed left, the coordinates of the markers move to the right.

*Fig. 5B-2*

*Fig. 5B-3* When the markers are in the center of the coordinates, the controller 107 is pointing to the middle of the screen.

When controller 107 is pointed right, the coordinates of the markers move to the left.

*Fig. 5B-4*

When controller 107 is pointed downward, the coordinates of the markers move up.

*Fig. 5B-5*

When controller 107 is moved away from markers 108a, 108b, the distance between the markers shrinks.

*Fig. 5B-6*

When controller 107 is moved toward markers 108a, 108b, the distance between the markers expands.

When controller 107 is rotated, the marker coordinates will rotate.

Steering and Rotating:
Full 360° Rotation (2)

- Solution
  - Linearly interpoate between x and y-axis

Fig. 12

SYSTEM AND METHOD FOR USING ACCELEROMETER OUTPUTS TO CONTROL AN OBJECT ROTATING ON A DISPLAY

CROSS-REFERENCE TO RELATED APPLICATION

This application claims the benefit of provisional Application No. 60/924,317 filed on May 9, 2007, the contents of which are incorporated herein in their entirety.

BACKGROUND AND SUMMARY

This application generally describes systems and methods for controlling a rotatable object (such as a steering wheel) displayed on a display screen and, in particular, using accelerometer outputs to effect such controlling.

User inputs to computer systems may be supplied in various ways. For example, when the computer system is a video game console, inputs are typically supplied using cross-switches, joysticks, buttons and the like provided on a controller. A cross-switch or a joystick may be used to control movement of a video game object in various directions and various buttons may be used to control character actions such as jumping, using a weapon and the like.

The controller described in this patent application additionally or alternatively includes an accelerometer arrangement that generates inputs to a video game console or other computer system based on certain movements and/or orientations of the controller. Such a controller can provide a more intuitive user interface in which, for example, movement of a video game object can be controlled by moving the controller in a particular manner. By way of illustration, a player may increase or decrease the altitude of a plane in a video game by tilting the controller up or down. The accelerometer arrangement can be used to provide gaming experiences that cannot be provided easily (if at all) using a controller having cross-switches, joysticks, buttons, etc.

This patent application describes example systems and methods for using accelerometer outputs to control a rotatable object (e.g., a steering wheel) on a display. By way of example without limitation, when an object such as steering wheel that can rotate more than 180 degrees on screen is controlled using a controller including an accelerometer, two accelerometer output axes are examined (e.g., both x and y axes). For a particular orientation of the controller, one of the accelerometer outputs is likely to be more accurate than another. For example, when the controller is facing upwardly, it may be more accurate to use the y-axis accelerometer output. Outside of that range, using the x-axis accelerometer output may be more desirable. To avoid having discontinuity when switching from one axis to another, linear interpolation between the two axis outputs can be used.

BRIEF DESCRIPTION OF THE DRAWINGS

FIGS. 5B-1 to 5B-8 are used in an explanation of how a direction in which example controller 107 is pointing is determined.

DETAILED DESCRIPTION OF EXAMPLE EMBODIMENTS

Figure 1:
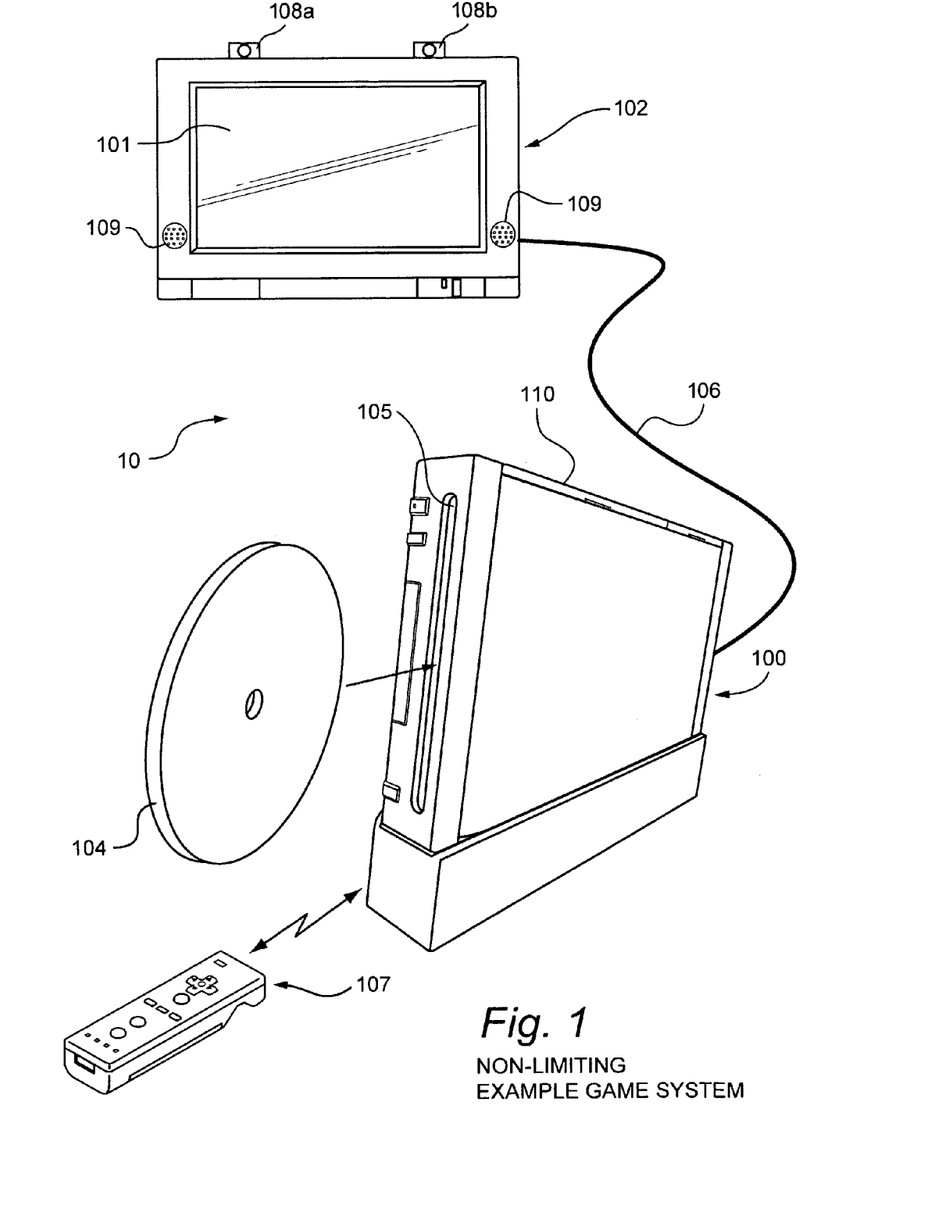
FIG. 1 is a diagram of an example game system 10.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. By way of example without limitation, light-emitting devices 108a and 108b may be implemented as two LED modules (hereinafter, referred to as "markers") provided in the vicinity of the display screen of television 102. The markers each output infrared light and the imaging information calculation section of controller 107 detects the light output from the LED modules to determine a direction in which controller 107 is pointing and a distance of controller 107 from display 101 as mentioned above.

Figure 2:
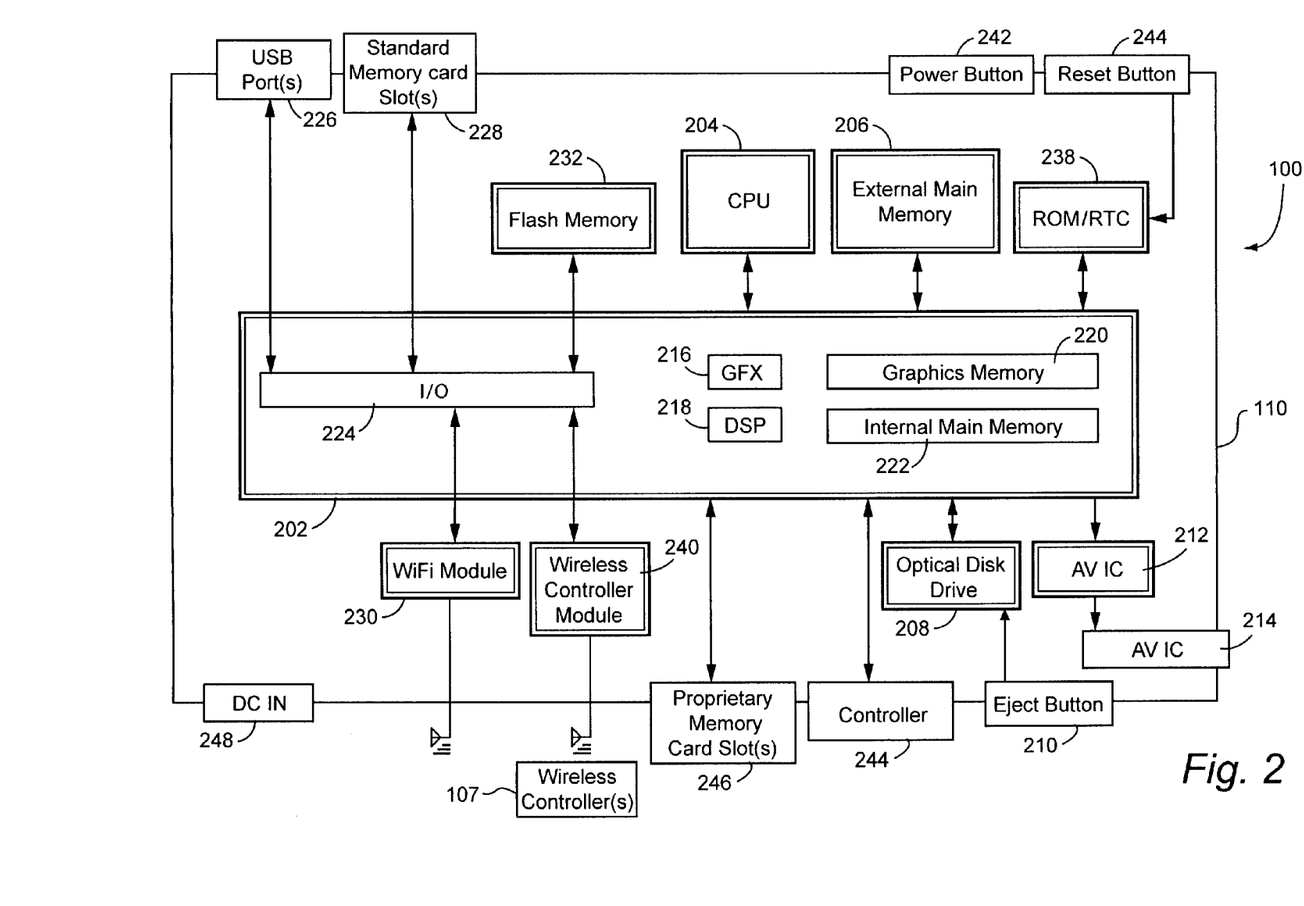
FIG. 2 is a block diagram of example game console 100 shown in FIG. 1.

With reference to the block diagram of FIG. 2, game console 100 includes a RISC central processing unit (CPU) 204 for executing various types of applications including (but not limited to) video game programs. CPU 204 executes a boot program stored, for example, in a boot ROM to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected (e.g., by a wired connection) to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3A:
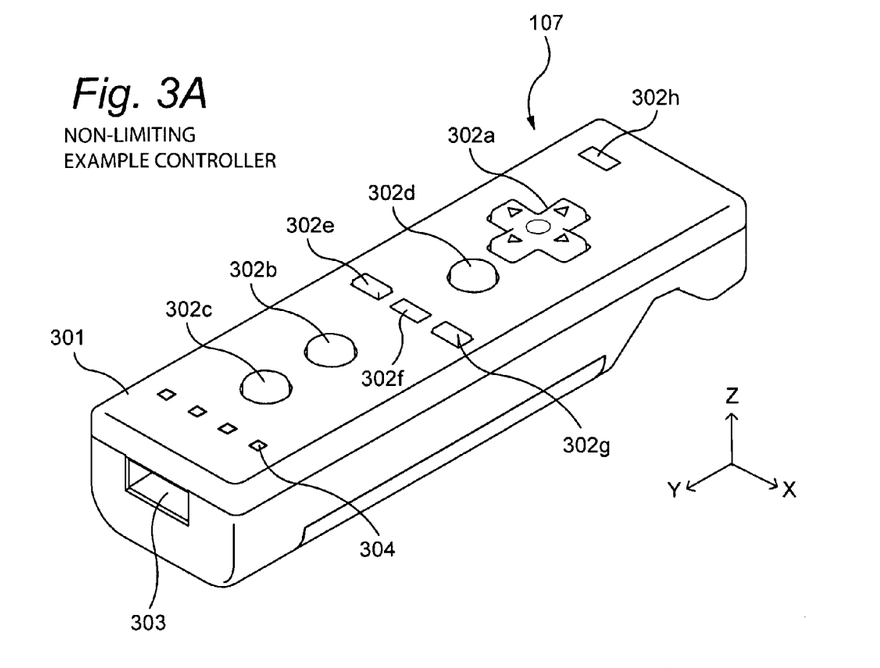
FIGS. 3A and 3B are perspective views of a top and a bottom of example controller 107 shown in FIG. 1.
Figure 3B:
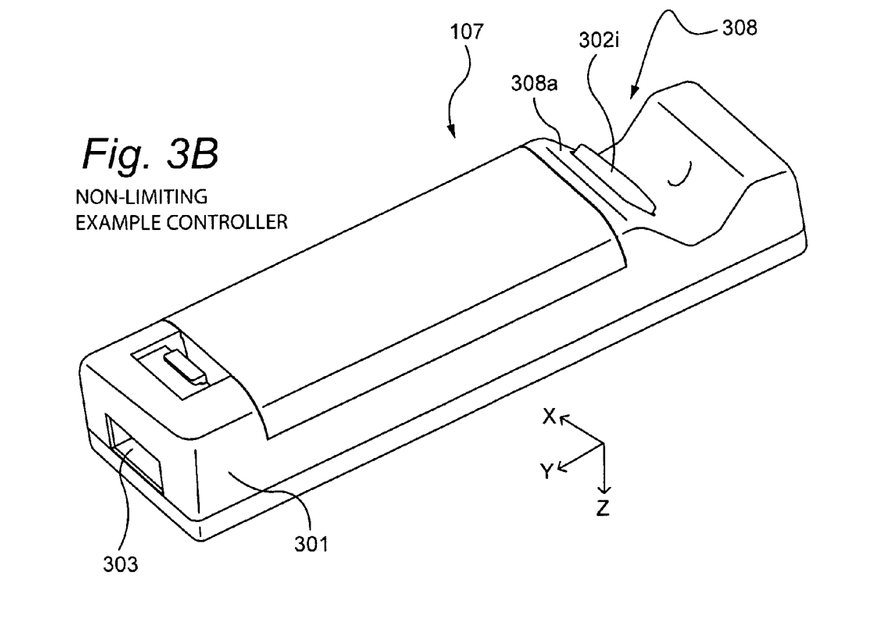
Figure 4:
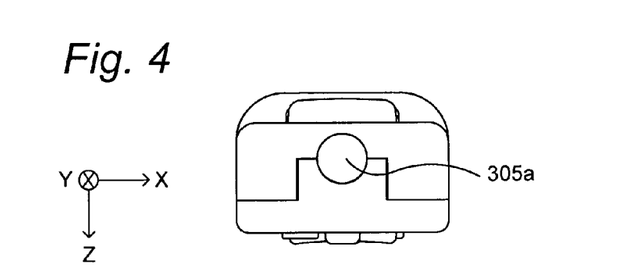
FIG. 4 is a front view of example controller 107 shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3A, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of the imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. Additional details of the operation of this section may be found in Application Nos. 60/716,937, entitled "VIDEO GAME SYSTEM WITH WIRELESS MODULAR HANDHELD CONTROLLER," filed on Sep. 15, 2005 (corresponding to U.S. Patent Publication No. 2007-0066394 A1); 60/732,648, entitled "INFORMATION PROCESSING PROGRAM," filed on Nov. 3, 2005 (corresponding to U.S. Patent Publication No. 2007-0072674 A1); and application No. 60/732,649, entitled "INFORMATION PROCESSING SYSTEM AND PROGRAM THEREFOR," filed on Nov. 3, 2005 (corresponding to U.S. Patent Publication No. 2007-0060228 A1). The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5A:
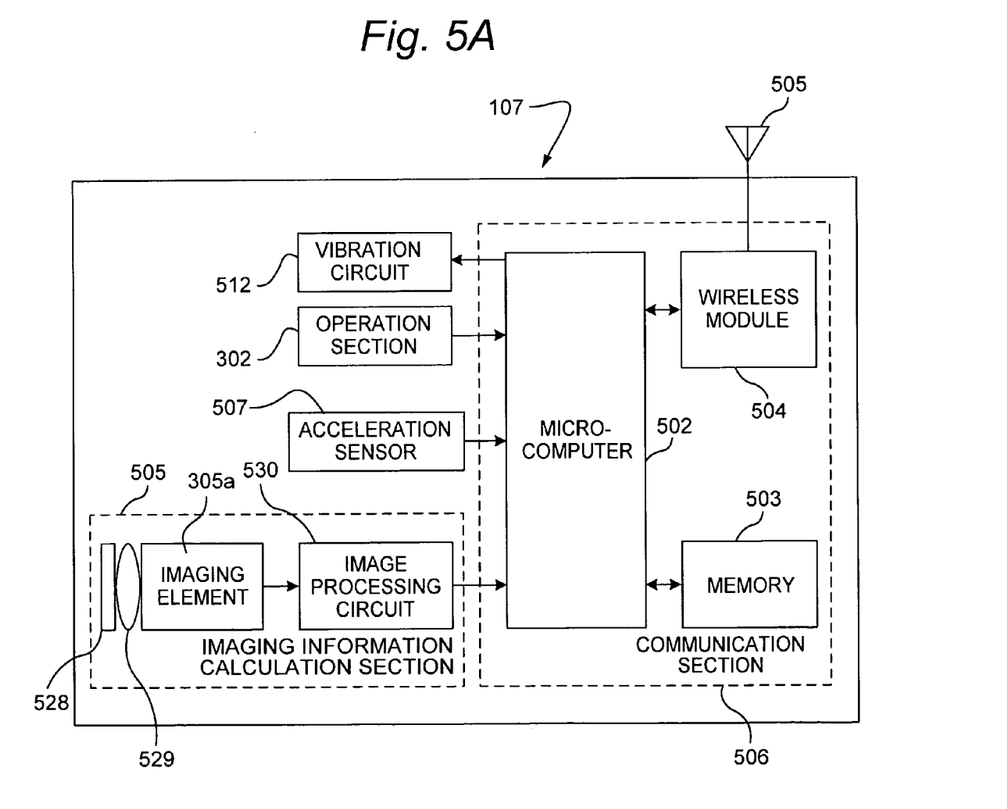
FIG. 5A is a block diagram of example controller 107 shown in FIG. 1.
Figure 5B:
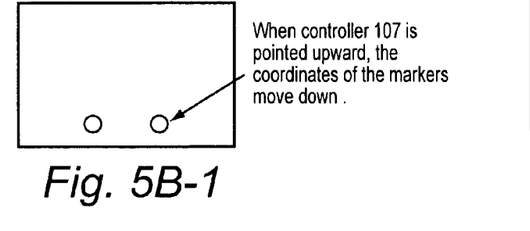
Figure 5B:
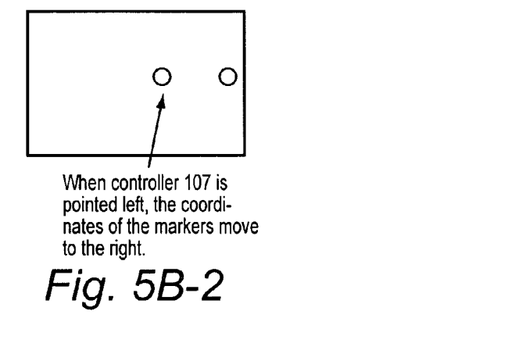
Figure 5B:
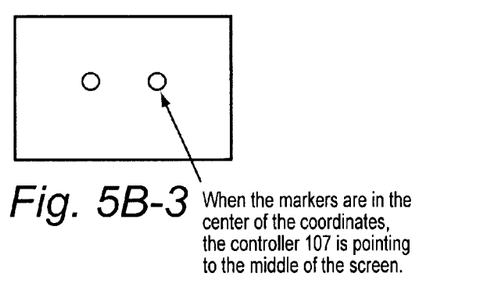
Figure 5B:
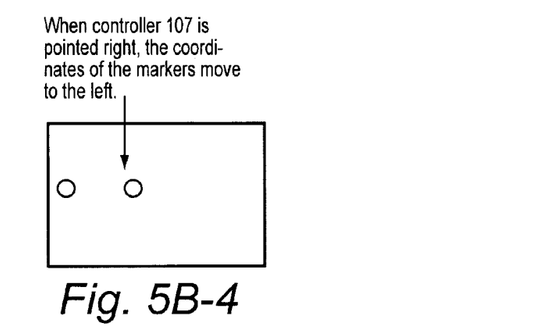
Figure 5B:
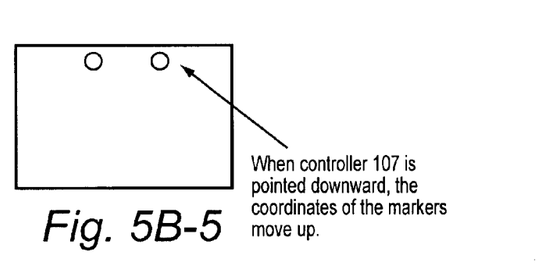
Figure 5B:
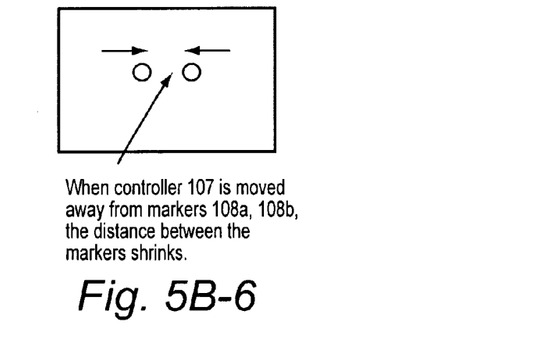
Figure 5B:
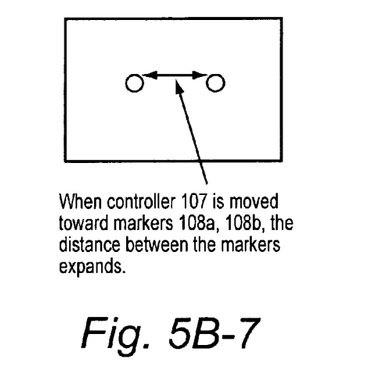
Figure 5B:
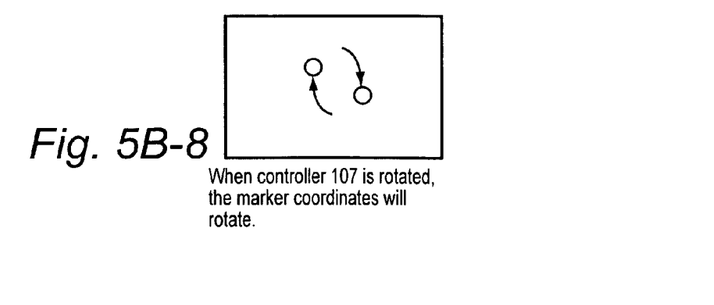

As shown in the block diagram of FIG. 5A, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis, for example, may be used or a one-axis linear accelerometer that only detects linear acceleration along the Z-axis, for example, may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 507 is subjected to dynamic accelerations by, for example, the hand of a user.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5A, imaging information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 529. Accordingly, imaging element 305a captures images of only the infrared light that has passed through infrared filter 528 and generates image data based thereon. This image data is processed by image processing circuit 530 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

FIGS. 5B-1 to 5B-8 show how a rotation of the controller or a direction in which controller 107 is pointing can be determined using markers 108a, 108b. In this example implementation, controller 107 points to the intermediate coordinates of the two markers on the sensor bar. In an example implementation, the pointer coordinates are 0-1023 on the X-axis and 0-767 on the Y-axis. With reference to FIG. 5B-1, when controller 107 is pointed upward, the coordinates of the markers detected at remote control 107 move down. With reference to FIG. 5B-2, when controller 107 is pointed left, the coordinates of the markers move to the right. With reference to FIG. 5B-3, when the markers are centered, remote controller 107 is pointed at the middle of the screen. With reference to FIG. 5B-4, when controller 107 is pointed right, the coordinates of the markers move to the left. With reference to FIG. 5B-5, when controller 107 is pointed downward, the coordinates of the markers move up. With reference to FIG. 5B-6, when controller 107 is moved away from markers 108a, 108b, the distance between the markers is reduced. With reference to FIG. 5B-7, when controller 107 is moved toward markers 108a, 108b, the distance between the markers increases. With reference to FIG. 5B-8, when controller 107 is rotated, the marker coordinates will rotate.

Figure 5C:
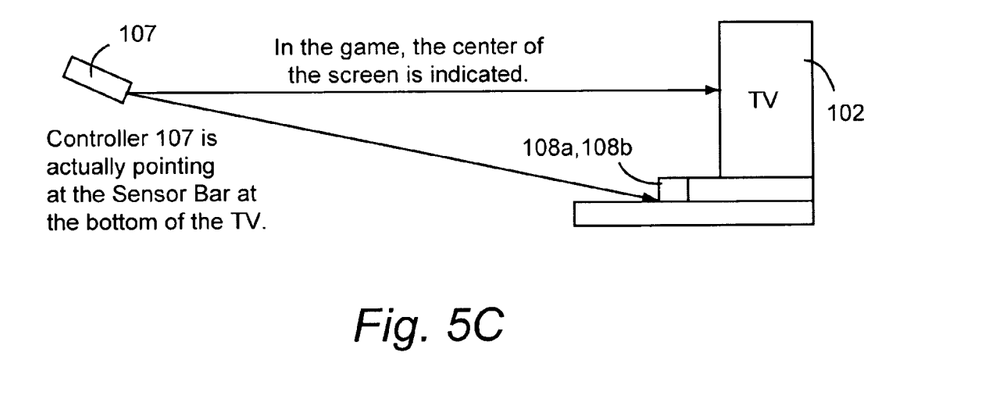
FIG. 5C is used in an explanation of the pointing direction of example controller 107.

FIG. 5C shows sensors 108a, 108b positioned below the display screen 101 of the television 102. As shown in FIG. 5C, when controller 107 is pointing toward the sensors, it is not actually pointing at the center of display screen 101. However, the game program or application executed by game machine 100 may treat this situation as one in which controller 107 is pointed at the center of the screen. In this case, the actual coordinates and the program coordinates will differ, but when the user is sufficiently far from the television, his or her brain automatically corrects for the difference between the coordinates seen by the eye and the coordinates for hand movement.

Again returning to FIG. 5A, vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

Figure 6A:
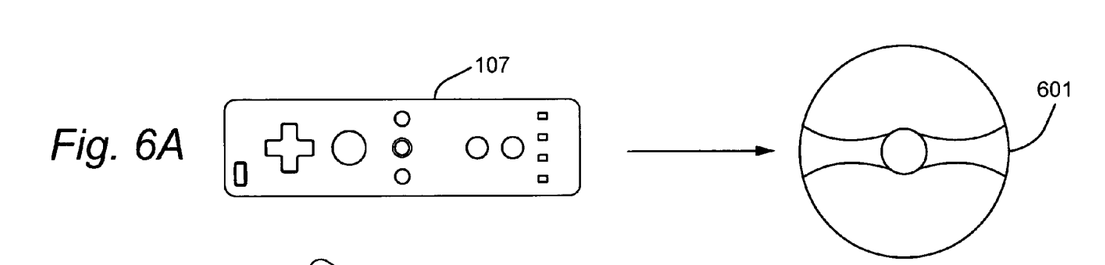
FIG. 6 provides an illustration of rotating a controller to control a rotatable object on a display.
Figure 6B:
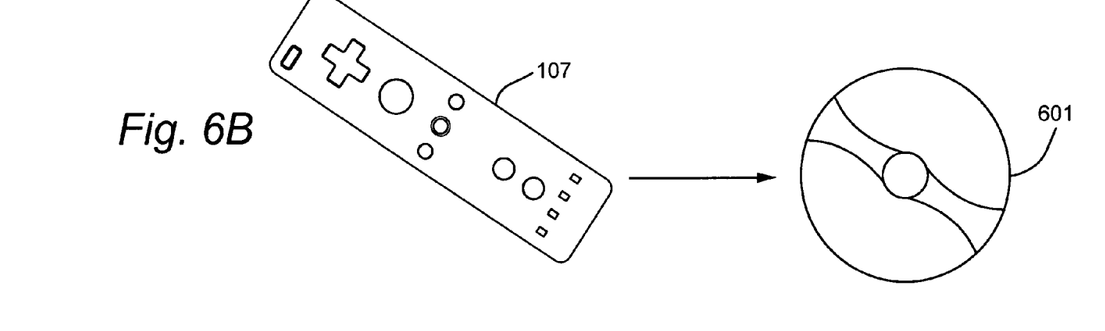
Figure 6C:
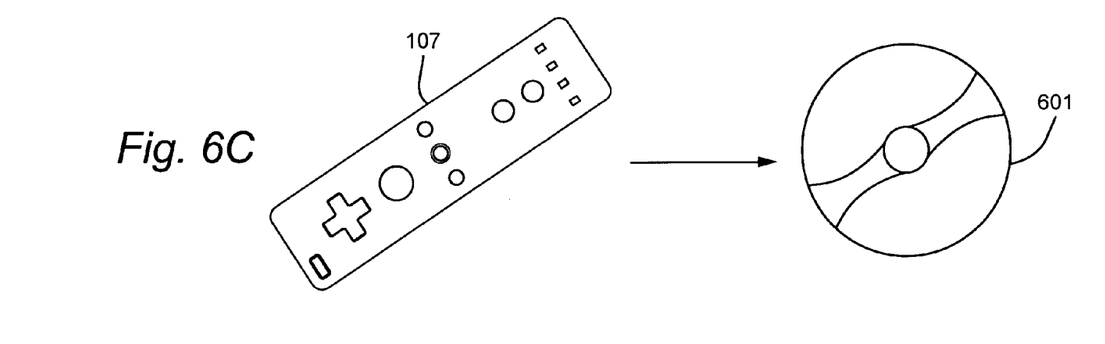

Example systems and methods for controlling a rotatable object displayed on display screen 101 will now be described. With reference to FIGS. 6A-6C, rotation of controller 107 can be used to rotate a steering wheel 601 displayed on a display screen. Outputs from the accelerometer are used to determined an orientation of controller 107 and the steering wheel is rotated based on the determined orientation. The processing of the accelerometer outputs may be performed by micro-computer 502 or CPU 204.

In an example implementation, holding the controller horizontally as shown in FIG. 6A will position steering wheel 601 in its normal (unrotated) position for straight driving. To turn right, controller 107 is rotated as shown in FIG. 6B, which causes a corresponding turning of the steering wheel 601. To turn left, controller 107 is rotated as shown in FIG. 6C, which causes a corresponding turning of steering wheel 601.

Using controller 107, steering wheel 601 can be rotated more than 180 degrees. In accordance with systems and methods and described herein, two accelerometer output axes are examined (e.g., both x and y axes) in order to determine the orientation of controller 107 and thereby the corresponding rotation of steering wheel 601. Specifically, for a particular orientation of controller 107, one of the accelerometer outputs is likely to be more accurate than another. For example, with reference to FIG. 7, when controller 107 is held generally upright, a more accurate orientation determination may be obtained using the x-axis accelerometer output. When controller 107 is held generally horizontally, a more accurate orientation determination may be obtained using the y-axis accelerometer output. Thus, it is desirable to use the x-axis accelerometer outputs to determine orientation when controller 107 is generally upright and the y-axis accelerometer outputs to determine orientation when controller 107 is generally horizontal. To avoid having discontinuity when switching from the accelerometer output for one axis to another, linear interpolation between the x- and y-axis accelerometer outputs is used. The interpolation may be of the form C1×Xoutput+(1−C1)×Youtput, where C1 is a constant.

Figure 8:
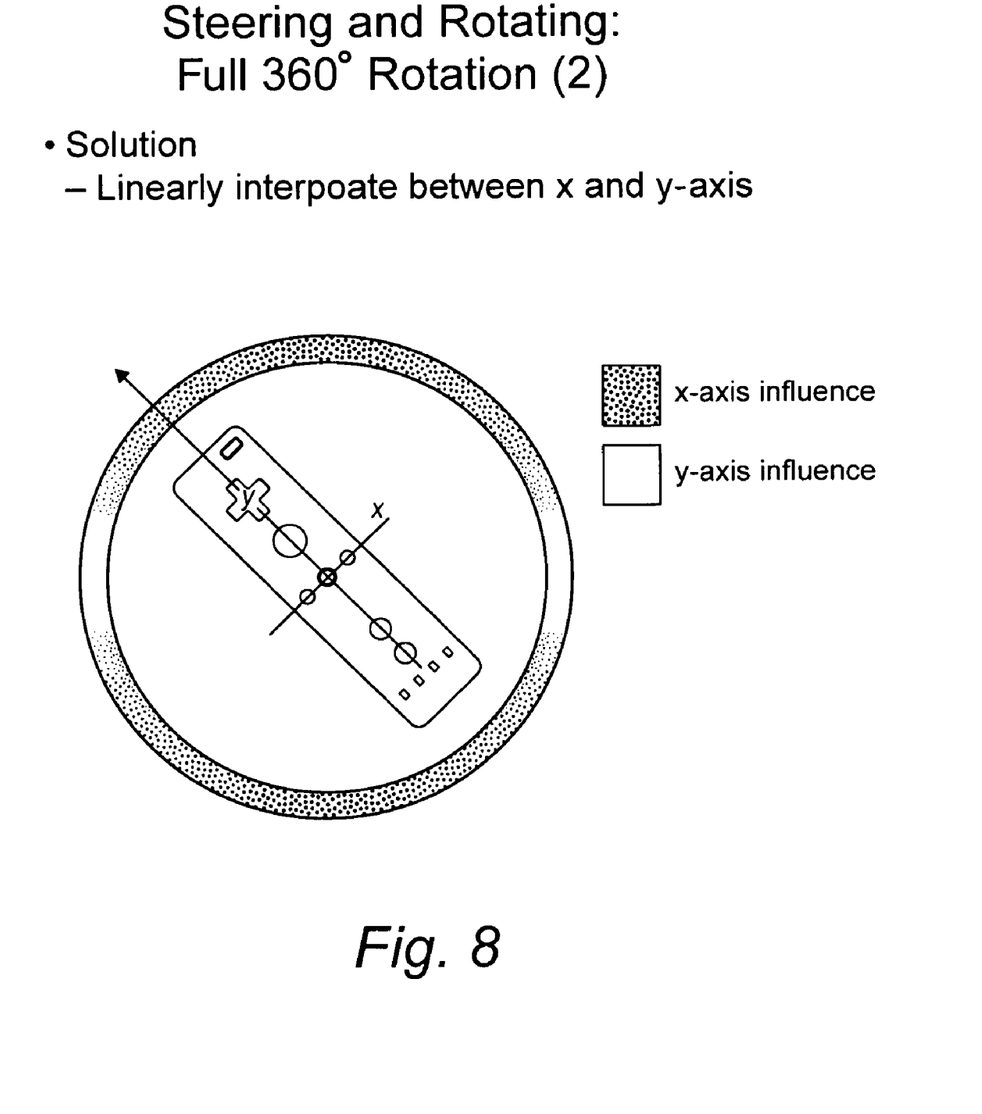
FIG. 8 provides a graphical illustration of linearly interpolating between different accelerometer outputs.

FIG. 8 schematically shows this linear interpolation in which the x-axis influence on orientation determination is greatest when controller 107 is generally upright and the y-axis influence on orientation determination is greatest when controller 107 is generally horizontal. Other types of interpolation (e.g., non-linear interpolation) may also be used.

Figure 7:
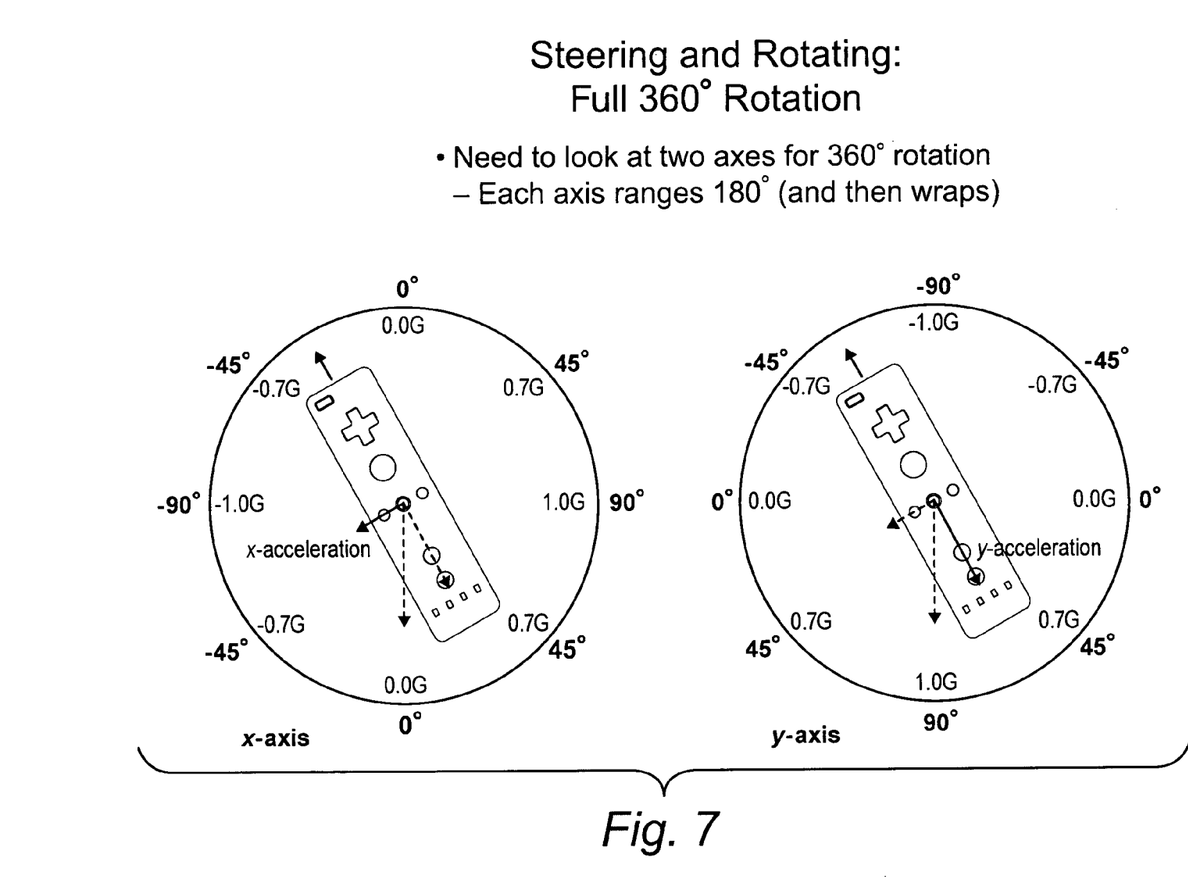
FIG. 7 provides an illustration of using two accelerometer outputs for determining controller orientation.
Figure 9:
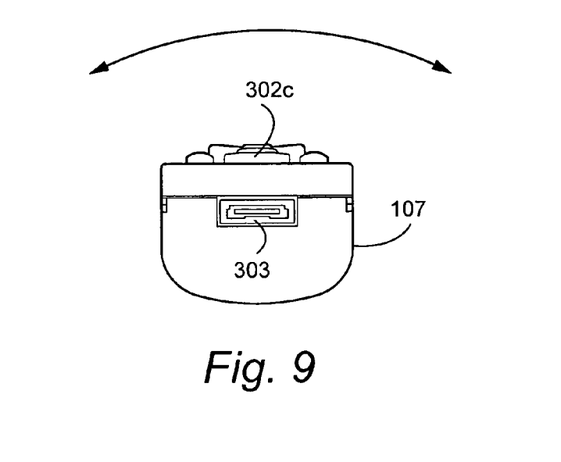
FIG. 9 shows another example orientation of a controller for controlling a rotatable object.
Figure 10:
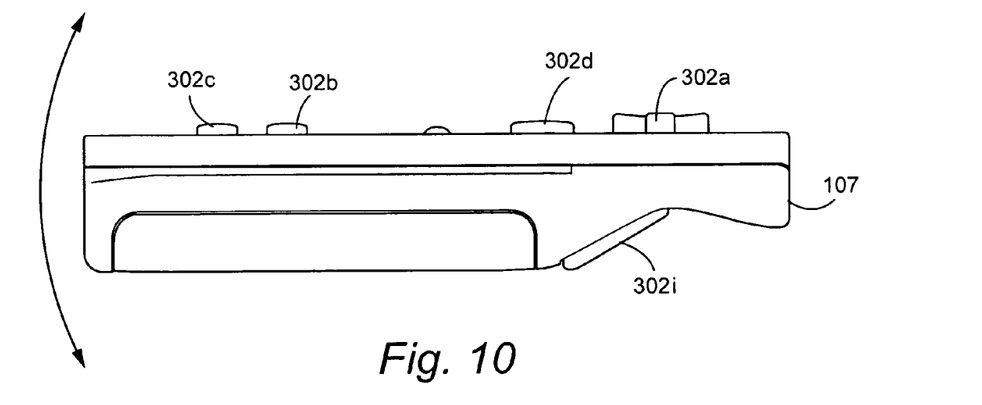
FIG. 10 shows yet another example orientation of a controller for controlling a rotatable object.

Control of steering 601 is not limited to moving the controller as shown in FIGS. 6A-6C. By way of example, steering wheel 601 may be turned by twisting controller 107 along its longitudinal axis as shown in FIG. 9 (e.g., like a screwdriver). In this case, linear interpolation of the x- and z-axis accelerometer outputs may, for example, be used to determine orientation of controller 107 (where the axes convention of FIG. 7 is used). By way of further example, steering wheel 601 may be turned by rotating controller 107 when held as shown in FIG. 10. In this case, linear interpolation of the y- and z-axis accelerometer outputs may, for example, be used to determine orientation of controller 107 (where the axes convention of FIG. 7 is used).

Figure 11:
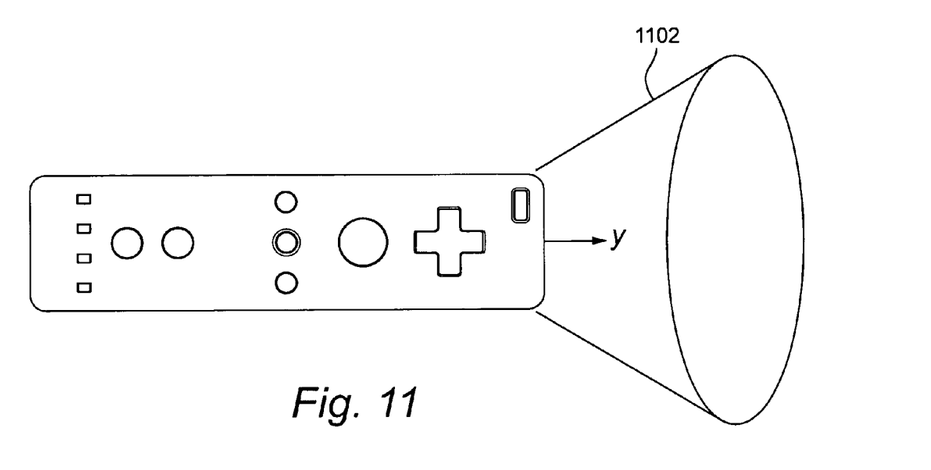
FIGS. 11 and 12 are used to explain an example mode changing operation of the controller.
Figure 12:
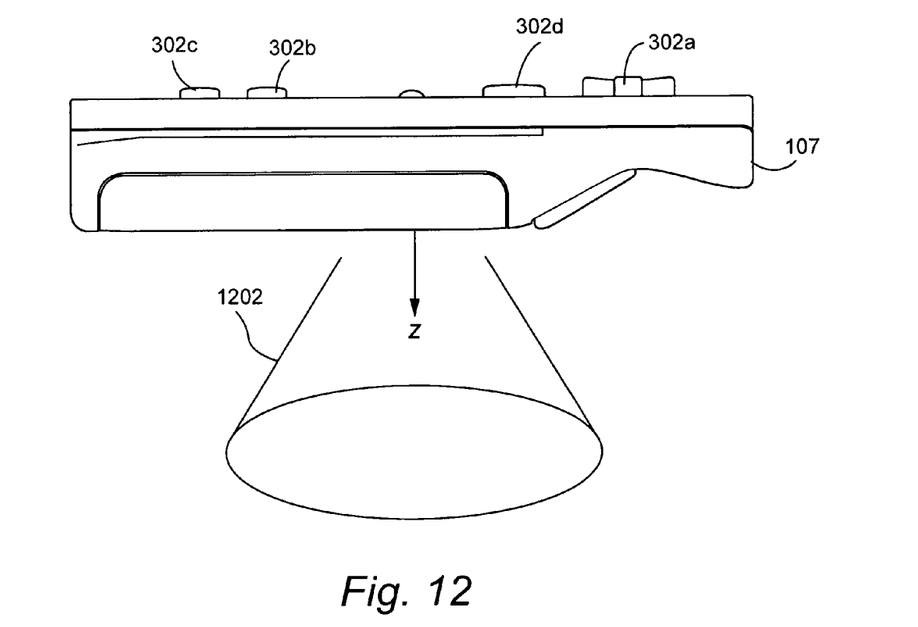

The systems and methods described herein also provide for mode switching between and among the different modes of steering wheel control shown in FIGS. 6, 9 and 10. A simple example to illustrate mode switching between two modes is described with reference to FIGS. 11 and 12. With reference to FIG. 11, when controller 107 is positioned so that the y-axis points within cone 1102, controller 107 enters a first mode in which x-axis and y-axis accelerometer outputs are used to determine controller orientation. With reference to FIG. 12, when controller 107 is positioned so that the z-axis is points within cone 1202, controller 107 enters a second mode in which the y-axis and z-axis accelerometer outputs are used to determine controller orientation.

In an example implementation, if controller 107 is in the first mode and is then positioned so that its y-axis points outside cone 1102, but its z-axis is not brought so that it points inside cone 1202, controller 107 remains in the first mode. Similarly, if controller 107 is in the second mode and then positioned so that its z-axis points outside cone 1202, but its y-axis is not brought so that it points inside cone 1102, controller 107 remains in the second mode.

It will be readily appreciated that the mode switching operation described above is only an example and that other more complicated arrangements of determining where one or more axes points may be used in mode switching. Moreover, the cones need not be the same size.

The systems and methods described herein may be implemented in hardware, firmware, software and combinations thereof. Software or firmware may be executed by a general-purpose or specific-purpose computing device including a processing system such as a microprocessor and a microcontroller. The software may, for example, be stored on a storage medium (optical, magnetic, semiconductor or combinations thereof) and loaded into a RAM for execution by the processing system. The systems and methods described herein may also be implemented in part or whole by hardware such as application specific integrated circuits (ASICs), field programmable gate arrays (FPGAs), logic circuits and the like.

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the spirit and scope of the appended claims.

I claim:

1. A method of controlling a rotatable object on a display using a handheld control device comprising an accelerometer, the method comprising:

determining an orientation of the handheld control device using a combined contribution of an output for a first axis of the accelerometer and an output for a second axis of the accelerometer obtained by interpolating the output for the first axis of the accelerometer and the output for the second axis of the accelerometer; and controlling rotation of the rotatable object based on the determined orientation, wherein the interpolation is based on the following equation:

$$Do = C1 \times Xoutput + (1-C1) \times Youtput$$

where Do is the determined orientation, C1 is a constant, Xoutput is the output for the first axis, and Youtput is the output for the second axis.

2. The method according to claim 1, wherein the accelerometer comprises a three-axis accelerometer.

3. A non-transitory computer-readable medium having computer readable code embodied therein for use in the execution in a computer of a method according to claim 1.

4. An image processing system comprising:

a handheld control device comprising an accelerometer; and a processing system for determining an orientation of the handheld control device using a combined contribution of an output for a first axis of the accelerometer and an output for a second axis of the accelerometer obtained by interpolating the output for the first axis of the accelerometer and the output for the second axis of the accelerometer and for controlling rotation of a rotatable object based on the determined orientation, wherein the interpolation is based on the following equation:

$$Do = C1 \times Xoutput + (1-C1) \times Youtput$$

where Do is the determined orientation, C1 is a constant, Xoutput is the output for the first axis, and Youtput is the output for the second axis.

5. The system according to claim 4, wherein the accelerometer comprises a three-axis accelerometer.

* * * * *